(12) United States Patent
Kikuchi et al.

(10) Patent No.: US 9,843,627 B2
(45) Date of Patent: Dec. 12, 2017

(54) INFORMATION PROCESSING METHOD, INFORMATION PROCESSING DEVICE, AND STORAGE MEDIUM

(71) Applicant: FUJITSU LIMITED, Kawasaki-shi, Kanagawa (JP)

(72) Inventors: Shinji Kikuchi, Yokohama (JP); Yasuhide Matsumoto, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 520 days.

(21) Appl. No.: 14/466,001

(22) Filed: Aug. 22, 2014

(65) Prior Publication Data

US 2014/0365607 A1 Dec. 11, 2014

Related U.S. Application Data

(63) Continuation of application No. PCT/JP2012/002139, filed on Mar. 28, 2012.

(51) Int. Cl.
*H04L 29/08* (2006.01)
*G06F 9/50* (2006.01)
*G06Q 10/06* (2012.01)

(52) U.S. Cl.
CPC ............ *H04L 67/10* (2013.01); *G06F 9/5072* (2013.01); *G06Q 10/06* (2013.01)

(58) Field of Classification Search
CPC ..... G06Q 10/06; H04L 67/10; H04L 12/4633; H04L 12/66; H04L 41/0806;
(Continued)

(56) References Cited

U.S. PATENT DOCUMENTS

2006/0161450 A1* 7/2006 Carey .................. G06Q 10/06 705/412
2008/0126166 A1  5/2008 Takahashi et al.
(Continued)

FOREIGN PATENT DOCUMENTS

JP  10-134066  5/1998
JP  11-53191   2/1999
(Continued)

OTHER PUBLICATIONS

European Office Action issued Mar. 11, 2016 in corresponding European Patent Application No. 12 872 521.5.
(Continued)

*Primary Examiner* — Greg C Bengzon
(74) *Attorney, Agent, or Firm* — Staas & Halsey LLP

(57) ABSTRACT

An information processing method to be executed by a processor included in an information processing device, the information processing method includes receiving a plurality of requests for constituent elements including a hardware and a software from a plurality of terminal devices; determining, among the plurality of requests, a pair of requests which is different from each other, a similarity of the pair of requests being a level more than a predetermined threshold; selecting terminal devices corresponding the pair of requests; setting a common request including a common element requested by at least two of the selected terminal devices, the common request being different from each of the pair of requests, the common request being different from each of the pair of requests; transmitting the common request and cost information to the selected terminal devices, the cost information being cheaper than each of the pair of requests.

16 Claims, 19 Drawing Sheets

(58) Field of Classification Search
CPC . H04L 41/5019; H04L 47/70; H04L 63/0272; H04L 63/102; H04L 67/02; H04L 67/16; H04L 67/34; H04L 12/1453; H04L 12/6418; H04L 41/082; H04L 41/0873; H04L 41/0896; H04L 41/12; H04L 41/145; H04L 43/08; H04L 47/76; H04L 63/0209; H04L 63/105; H04L 63/20; H04L 67/22; H04L 67/38; G06F 9/50; G06F 9/5072; G06F 9/5077; G06F 9/45558; G06F 11/1482; G06F 11/3442; G06F 15/173; G06F 17/30442; G06F 2009/45587; G06F 2009/45595; G06F 21/31; G06F 3/0482; G06F 3/04842; G06F 3/0619; G06F 3/0665; G06F 3/0689; G06F 8/65; G06F 9/455; G06F 9/45533; G06F 9/5027; G06F 9/5061; G06F 9/5066; G06F 9/508

See application file for complete search history.

(56) References Cited

U.S. PATENT DOCUMENTS

| | | | |
|---|---|---|---|
| 2008/0239985 A1* | 10/2008 | Karve | H04L 41/0856 370/254 |
| 2009/0187651 A1* | 7/2009 | Schuckenbrock | G06Q 10/06 709/224 |
| 2010/0049637 A1* | 2/2010 | Laventman | G06Q 10/06 705/30 |
| 2010/0077449 A1* | 3/2010 | Kwok | G06F 9/5027 726/3 |
| 2010/0131624 A1* | 5/2010 | Ferris | G06F 9/5072 709/221 |
| 2010/0250748 A1* | 9/2010 | Sivasubramanian | G06F 9/5016 709/226 |
| 2011/0184968 A1 | 7/2011 | Kitajima et al. | |
| 2011/0231899 A1* | 9/2011 | Pulier | G06F 9/45558 726/1 |
| 2011/0270968 A1* | 11/2011 | Salsburg | G06F 9/5072 709/224 |
| 2011/0296019 A1* | 12/2011 | Ferris | G06F 9/45533 709/226 |
| 2011/0321031 A1* | 12/2011 | Dournov | G06F 9/45533 717/171 |
| 2012/0011518 A1* | 1/2012 | Duan | G06F 9/505 718/104 |
| 2012/0022910 A1* | 1/2012 | Chi | G06F 9/5072 705/7.22 |
| 2012/0047265 A1* | 2/2012 | Agarwala | G06F 9/5072 709/226 |
| 2012/0109873 A1* | 5/2012 | Xiong | G06Q 10/0633 706/52 |
| 2012/0131176 A1* | 5/2012 | Ferris | G06F 9/5072 709/224 |
| 2012/0131591 A1* | 5/2012 | Moorthi | G06Q 10/06 718/104 |
| 2012/0173708 A1* | 7/2012 | Bartfai-Walcott | G06F 9/5072 709/224 |
| 2012/0185913 A1* | 7/2012 | Martinez | G06F 9/455 726/1 |
| 2012/0226796 A1* | 9/2012 | Morgan | H04L 12/1453 709/224 |
| 2012/0304179 A1* | 11/2012 | Devarakonda | G06F 9/5072 718/102 |
| 2012/0324069 A1* | 12/2012 | Nori | H04L 41/0806 709/222 |
| 2013/0007272 A1* | 1/2013 | Breitgand | G06Q 10/06 709/224 |
| 2013/0024573 A1* | 1/2013 | Kushida | G06F 9/5077 709/226 |
| 2013/0138806 A1* | 5/2013 | Gohad | H04L 43/08 709/224 |
| 2013/0138812 A1* | 5/2013 | Assuncao | G06F 9/50 709/226 |
| 2013/0179289 A1* | 7/2013 | Calder | G06Q 30/08 705/26.3 |
| 2013/0179894 A1* | 7/2013 | Calder | G06F 9/5027 718/104 |
| 2013/0205007 A1* | 8/2013 | Ayachitula | G06F 9/5072 709/224 |
| 2013/0219068 A1* | 8/2013 | Ballani | G06F 9/5061 709/226 |
| 2013/0232498 A1* | 9/2013 | Mangtani | G06F 9/5072 718/104 |
| 2013/0346360 A1* | 12/2013 | Liu | G06F 17/30289 707/609 |
| 2014/0040999 A1* | 2/2014 | Zhang | G06F 21/31 726/5 |
| 2014/0188532 A1* | 7/2014 | Liu | G06Q 10/0631 705/7.12 |
| 2014/0365607 A1* | 12/2014 | Kikuchi | H04L 67/10 709/217 |
| 2016/0057019 A1* | 2/2016 | Koo | G06F 9/5072 715/736 |
| 2016/0212020 A1* | 7/2016 | Gupte | H04L 67/10 |
| 2017/0004018 A1* | 1/2017 | Mangtani | G06F 9/5038 |

FOREIGN PATENT DOCUMENTS

| | | |
|---|---|---|
| JP | 2002-183416 | 6/2002 |
| JP | 2008-171121 | 7/2008 |
| JP | 2010-140209 | 6/2010 |
| JP | 2011-154540 | 8/2011 |
| WO | 2005/089246 A2 | 9/2005 |
| WO | WO 2006/070455 A1 | 7/2006 |

OTHER PUBLICATIONS

Extended European Search Report issued Sep. 15, 2015 in corresponding European Patent Application No. 12872521.5.
Shigenori Kobayashi et al., "Optimization of Application Development dealing with Multitenancy [SystemDirector Enterprise]", *NEC Technical Journal,* Apr. 23, 2010, 5 pp., vol. 63, No. 2.
Hideo Nakayama et al., "Conceptualization of Cloud Use System; Part 1: Public Cloud into a Stage of Practical Use", *Nikkei Systems,* Dec. 26, 2010, 4 pp., No. 213.
Junichi Niino, "Course of Evolution of PaaS and Cloud Platform without Virtualization", *Publickey* online article, Jul. 6, 2011, 7 pp., last searched on Mar. 7, 2012, <URL: http://www.publickey1.jp/blog/11/paas_1.html>.
International Search Report dated Apr. 24, 2012, in corresponding International Patent Application No. PCT/JP2012/002139.

* cited by examiner

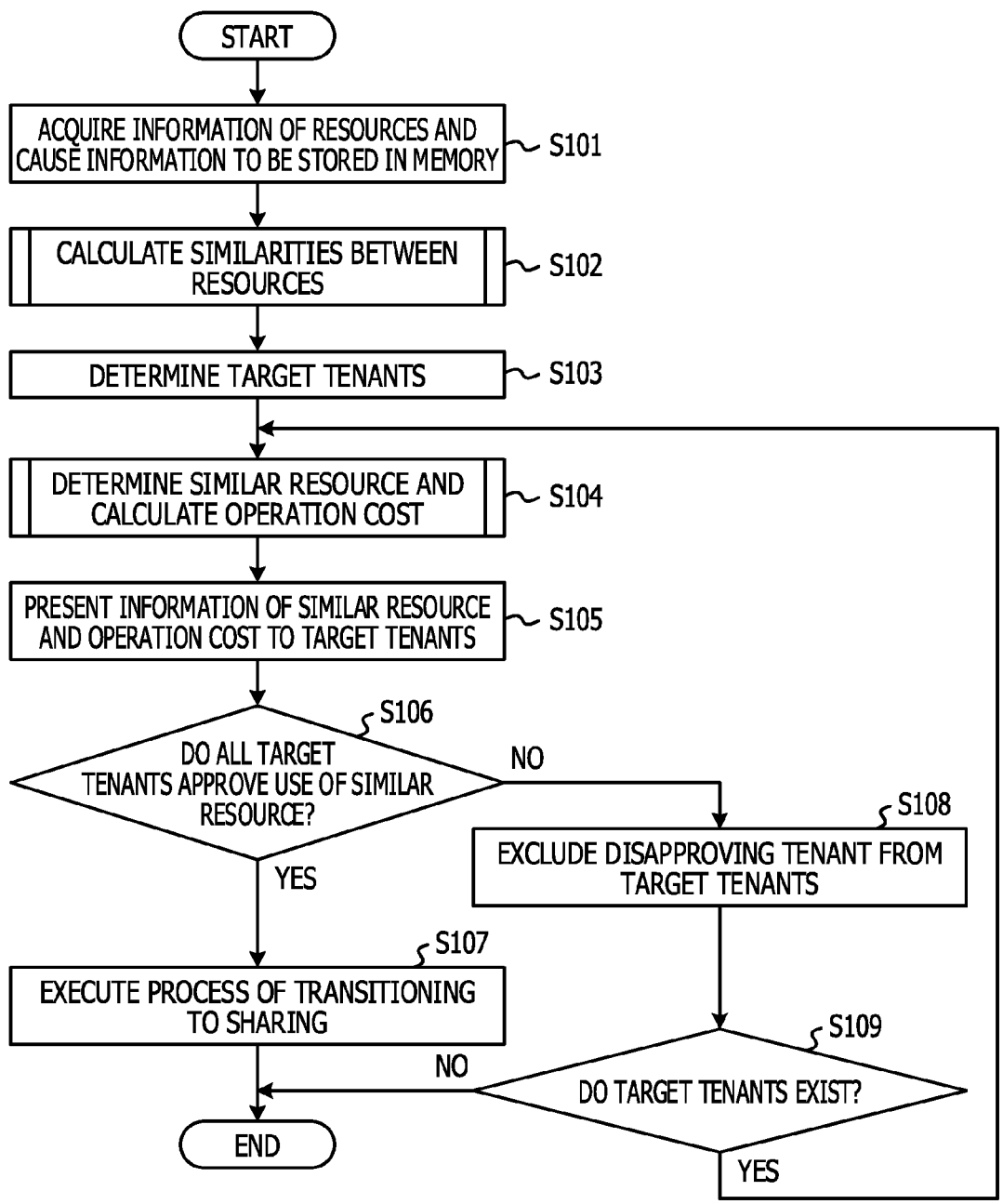

| TENANT | CONSTITUENT ELEMENT 1 (APPLICATION AND OS) | CONSTITUENT ELEMENT 2 (APPLICATION AND OS) | CONSTITUENT ELEMENT 3 (APPLICATION AND OS) | ... |
|---|---|---|---|---|
| A | App-a 2.0 / OS-a 4.0 | App-a 2.4 / OS-a 4.5 | App-b 4.1 / OS-a 4.2 | |
| B | App-a 2.4 / OS-a 4.5 | App-b 4.1 / OS-a 4.5 | | |
| C | App-c 2.6 / OS-c 1.0 | App-b 4.1 / OS-a 4.5 | | |
| D | App-c 7.0 / OS-b 3.0 | App-c 6.0 / OS-b 1.0 | App-d 10 / OS-b 2.0 | |
| E | App-c 7.0 / OS-b 2.0 | App-b 5.0 / OS-b 2.0 | | |
| F | App-c 7.0 / OS-b 2.0 | App-b 4.0 / OS-b 2.0 | | |

FIG. 6

| CHANGE OPERATION | DISTANCE (POINT) |
|---|---|
| NONE (NO OPERATION) | 0 |
| UPGRADE OF OS OR APPLICATION OR PATCH APPLICATION | 1 |
| INSTALLATION, UNINSTALLATION, OR DOWNGRADE OF APPLICATION | 2 |
| SWITCHING OF OSs, DOWNGRADE OF OS, OR CHANGE OF DATABASE | 4 |

FIG. 9

| | A | B | C | D | E | F |
|---|---|---|---|---|---|---|
| A | – | 3 | 6 | 20 | 18 | 18 |
| B | 4 | – | 6 | 14 | 12 | 12 |
| C | 10 | 6 | – | 12 | 12 | 12 |
| D | 20 | 20 | 20 | – | 16 | 16 |
| E | 12 | 12 | 12 | 10 | – | 2 |
| F | 12 | 12 | 12 | 10 | 1 | – |

TENANTS (SOURCES)

TENANTS (DESTINATIONS)

FIG. 10A
|   | A | B | C | D | E | F |
|---|---|---|---|---|---|---|
| A | – | 3 | 6 | 20 | 18 | 18 |
| B | 4 | – | 6 | 14 | 12 | 12 |
| C | 10 | 6 | – | 12 | 12 | 12 |
| D | 20 | 20 | 20 | – | 16 | 16 |
| E | 12 | 12 | 12 | 10 | – | 2 |
| F | 12 | 12 | 12 | 10 | 1 | – |
TENANTS (SOURCES)
TENANTS (DESTINATIONS)
FIG. 10B
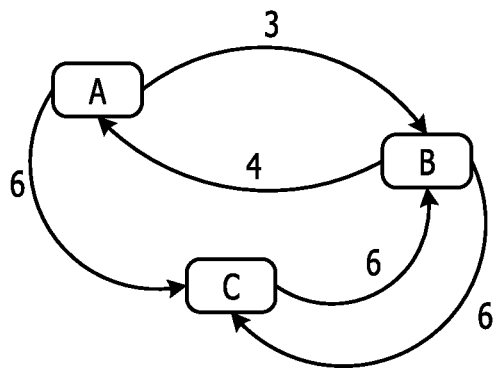
FIG. 10C
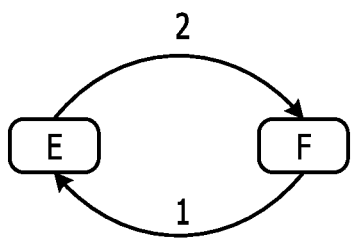

FIG. 16

|  | BEFORE SHARING | AFTER SHARING | AGGREGATION RATIO (REDUCTION EFFECT) |
|---|---|---|---|
| NUMBER OF CONSTITUENT ELEMENTS | 25 | 12 | 0.48 |
| NUMBER OF TYPES OF CONSTITUENT ELEMENTS | 16 | 11 | 0.68 |

FIG. 19A

| CHANGE OPERATION | DISTANCE (COST) |
|---|---|
| NONE (NO OPERATION) | ¥0 |
| UPGRADE OF OS OR APPLICATION OR PATCH APPLICATION | ¥1,000 |
| INSTALLATION OR DOWNGRADE OF APPLICATION | ¥10,000 |
| SWITCHING OF OSs OR DOWNGRADE OF OS | ¥30,000 |
| CHANGE OF DATABASE | ¥200,000 |

FIG. 19B

| CHANGE OPERATION | DISTANCE (TIME) |
|---|---|
| NONE (NO OPERATION) | 0 MINUTES |
| UPGRADE OF OS OR APPLICATION OR PATCH APPLICATION | 10 MINUTES |
| INSTALLATION OR DOWNGRADE OF APPLICATION | 30 MINUTES |
| SWITCHING OF OSs OR DOWNGRADE OF OS | 3 HOURS |
| CHANGE OF DATABASE | 72 HOURS |

INFORMATION PROCESSING METHOD, INFORMATION PROCESSING DEVICE, AND STORAGE MEDIUM

CROSS-REFERENCE TO RELATED APPLICATION

This application is a continuation application of International Application PCT/JP2012/002139 filed on Mar. 28, 2012, the entire contents of which are incorporated herein by reference.

FIELD

The embodiment discussed herein is related to an information processing method, an information processing device, and a storage medium.

BACKGROUND

Cloud computing is a user environment where users receive services through networks such as the Internet, and the spread of cloud computing has been promoted in recent years. In cloud computing, many tenants (users) use servers installed in a large data center or the like. This method causes an advantage of scale, and a unit price for use of an infrastructure of the data center may be reduced. Since the tenants may outsource operations and management of the servers to a provider (service provider) that provides services, a cost of the operations and management may be reduced.

FIGS. 1A and 1B are diagrams illustrating examples of the type of a multi-tenant architecture that achieves cloud computing. FIG. 1A illustrates a multi-tenant architecture called an Infrastructure-as-a-Service-based (IaaS-based) virtual native Platform as a Service (PaaS). As illustrated in FIG. 1A, the virtual native PaaS has a layer structure composed of constituent elements such as hardware, virtual machines, operating systems (OSs), databases (DBs), and application software (hereinafter referred to as applications). In the virtual native PaaS, only a hardware infrastructure is shared by tenants. A virtual machine, an OS, a DB, and an application are used for each of the tenants. In the virtual native PaaS, each tenant may freely select and combine a virtual machine, an OS, a DB, and an application.

FIG. 1B illustrates a multi-tenant architecture called a multi-tenant native PaaS. As illustrated in FIG. 1B, the architecture that is called the multi-tenant native PaaS has a layer structure composed of constituent elements such as hardware, an OS, a DB, an application, and the like. In the multi-tenant native PaaS, not only the hardware but also the OS, the DB, and the application are shared by tenants. Only business processes that are executed by this infrastructure are different for the tenants. In the multi-tenant native PaaS, the application and the DB are shared by the tenants. Thus, an aggregation efficiency of the infrastructure is high and efficiencies of operations and management may be improved. As related art, there are Japanese Laid-open Patent Publication Nos. 2010-140209, 2011-154540, 10-134066, 11-53191, Junichi Niino, "Course of Evolution of PaaS and Cloud Platform without Virtualization", online, searched on Mar. 7, 2012, <URL: http://www.publickey1.jp/blog/11/paas_1.html>, and the like.

In the virtual native PaaS, the virtual machines, the OSs, the DBs, and the applications are different for the tenants, and processes are separately executed for the tenants in an actual operation. Thus, the architecture is redundant and is not efficient, and servers of a data center may not be effectively used in the virtual native PaaS. In addition, a provider of the virtual native PaaS manages combinations of a large number of constituent elements. Thus, operations and management of the servers are complex, and an operation cost (running cost) per tenant is high.

In the multi-tenant native PaaS, the OS, the DB, and middleware are shared by multiple tenants, as described above. Thus, each tenant does not freely select an OS, a DB, and the type of an application, and the flexibility of selecting an architecture is low.

SUMMARY

According to an aspect of the invention, an information processing method to be executed by a processor included in an information processing device, the information processing method includes receiving a plurality of requests for constituent elements including a hardware and a software from a plurality of terminal devices; determining, among the plurality of requests, a pair of requests which is different from each other, a similarity of the pair of requests being a level more than a predetermined threshold; selecting terminal devices corresponding the pair of requests; setting a common request including a common element requested by at least two of the selected terminal devices, the common request being different from each of the pair of requests; transmitting the common request and cost information corresponding to the common request to the selected terminal devices, the cost information being cheaper than each of the pair of requests.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a flowchart of operations of an information processing device according to the embodiment;

FIG. 6 is a diagram illustrating an example of corresponding relationships between the types of methods for changing a resource and load levels representing loads caused by changes;

FIG. 9 is a diagram illustrating an example of results of calculating similarities between resources requested for use by the tenants illustrated in FIGS. 4A and 4B;

FIG. 10A is a diagram illustrating an example in which combinations of tenants targeted for sharing are extracted;

FIGS. 10B and 10C are state transition diagrams illustrating examples of the extracted combinations of the tenants targeted for the sharing;

FIG. 16 is a diagram illustrating results of calculating, based on the example illustrated in FIG. 12, the numbers of constituent elements of resources before and after the execution of the sharing and the numbers of types of the constituent elements of the resources before and after the execution of the sharing;

FIGS. 19A and 19B are diagrams illustrating examples of a definition of distances between resources of servers.

DESCRIPTION OF EMBODIMENT

Hereinafter, an embodiment is described in detail with reference to FIGS. 1 to 19B.

Figure 1A:
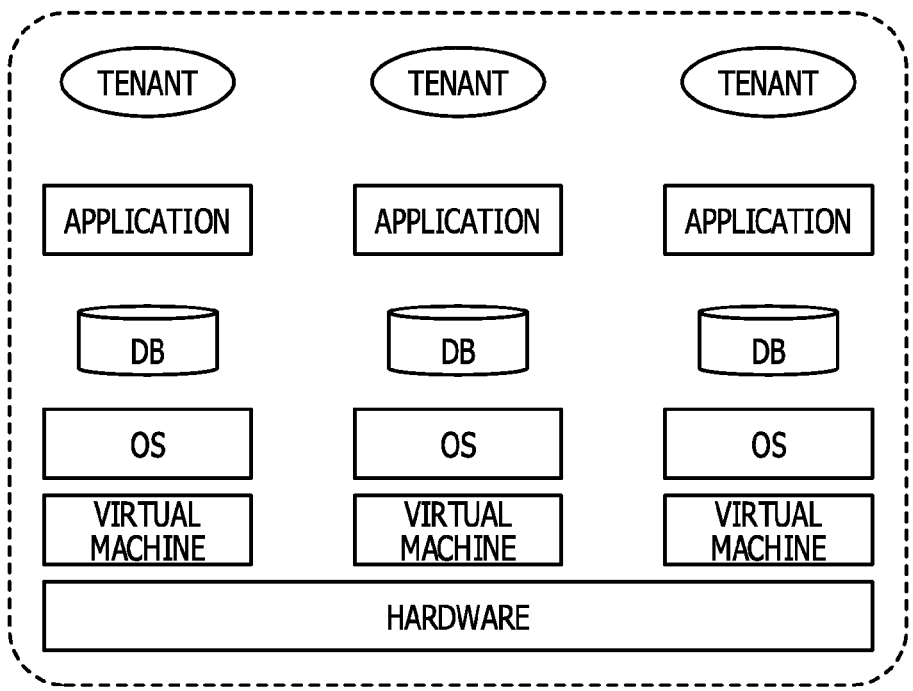
FIGS. 1A and 1B are diagrams illustrating examples of the type of a multi-tenant architecture that achieves cloud computing.
Figure 1B:
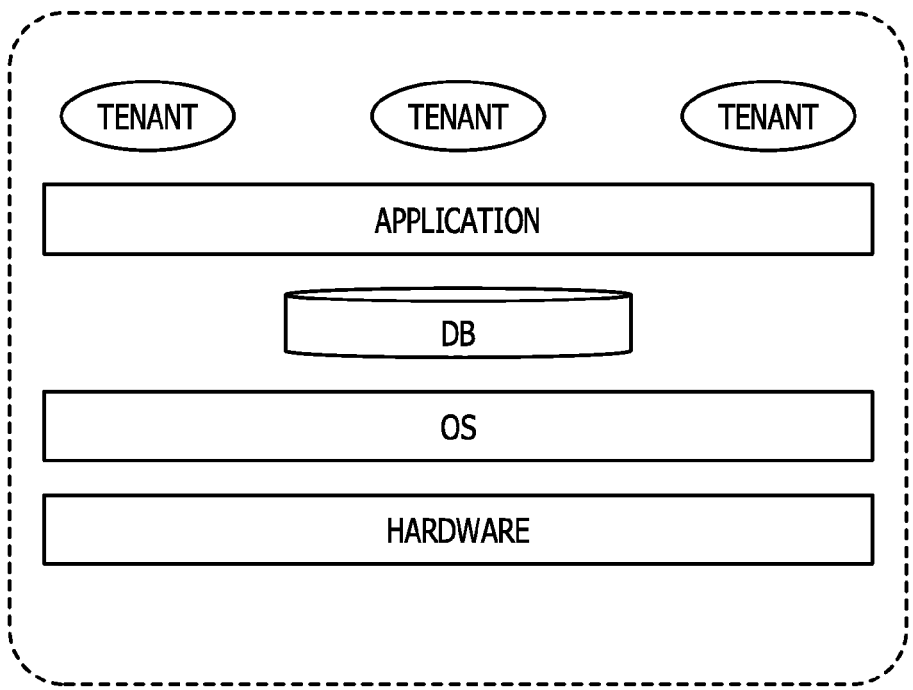
Figure 2:
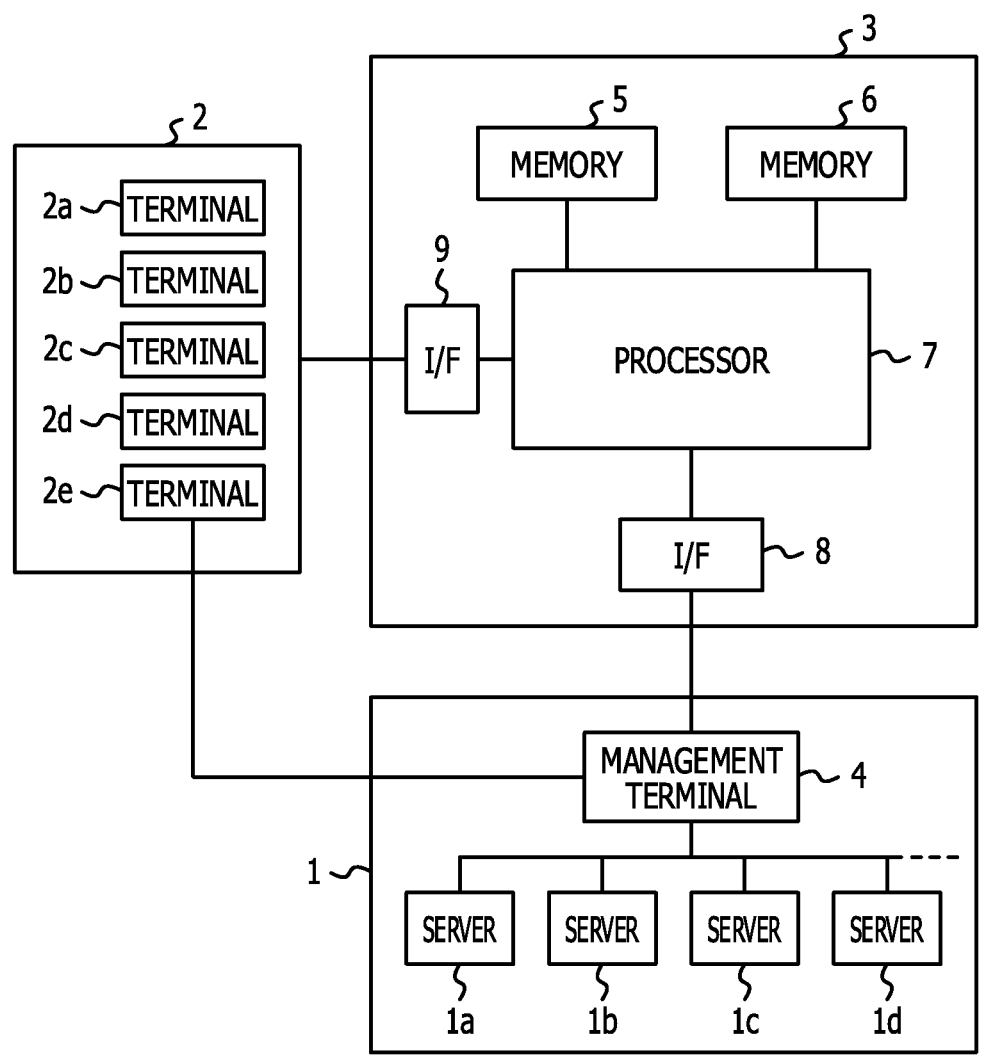
FIG. 2 is a diagram illustrating an example of a cloud computing system according to an embodiment.

FIG. 2 is a diagram illustrating an example of an information processing system according to the embodiment. As illustrated in FIG. 2, the information processing system includes a cloud system infrastructure 1, terminals 2, and an information processing device 3. The cloud system infrastructure 1, the terminals 2, and the information processing device 3 are connected to each other and able to communicate with each other.

The cloud system infrastructure 1 is installed, for example, in a data center and includes servers 1a, 1b, 1c, and 1d configured to provide services to many tenants. The tenants may receive desired services from the cloud system infrastructure 1 through a network such as the Internet. Each of the servers 1a to 1d may operate with a resource including, as constituent elements, multiple types of software such as an OS and an application, for example.

The cloud system infrastructure 1 includes a management terminal 4. The management terminal 4 is connected to the servers 1a to 1d and able to communicate with the servers 1a to 1d. The management terminal 4 may cause each of the servers 1a to 1d to execute processes such as a process of upgrading an OS and a process of installing software, based on signals received from the information processing device 3.

The terminals 2 are user interfaces owned by the tenants that use the cloud system infrastructure 1. The tenants own the different terminals. FIG. 2 exemplifies terminals 2a, 2b, 2c, 2d, and 2e owned by five tenants. The terminals 2 are personal computers (PCs) or mobile terminals such as mobile phones, for example.

Functions of units of the information processing device 3 are described below. The information processing device 3 includes a memory 5, a memory 6, a processor 7, an interface (I/F) 8, and an interface (I/F) 9.

The memory 5 is an example of a storage unit. The memory 5 is electrically connected to the processor 7. The memory 5 may store request information representing resources requested by the tenants that use the cloud system infrastructure 1. The memory 5 may store information on costs of operations with resources. As the memory 5, a semiconductor memory such as a random access memory (RAM) or a flash memory, or a hard disk drive (HDD), may be used, for example. The information processing device 3 may have a plurality of the memories 5.

The memory 6 is electrically connected to the processor 7. The memory 6 may store an information processing program for executing a process of sharing a resource (or aggregating resources). As the memory 6, a semiconductor memory such as a read only memory (ROM) or a flash memory, or an HDD, may be used, for example. The information processing device 3 may have a plurality of the memories 6. The memory 5 and the memory 6 may be formed by a single memory.

The processor 7 is an example of a processing unit. The processor 7 may execute the information processing program based on the information representing the resources and stored in the memory 5 and the information representing the costs of the operations with the resources and stored in the memory 5. The processor 7 executes, in accordance with the information processing program, a process (described later) of collecting resource information, a process (described later) of calculating similarities, a process (described later) of determining a similar resource, a process (described later) of calculating a cost, and the process (described later) of executing sharing. The processor 7 is a central processing unit (CPU), for example.

The interface (I/F) 8 has an input and output interface function of transmitting and receiving a signal between the processor 7 and the cloud system infrastructure 1 and connecting the processor 7 to the cloud system infrastructure 1. The interface (I/F) 8 may transmit a signal to the management terminal 4 of the cloud system infrastructure 1 based on a signal received from the processor 7. The interface (I/F) 8 may transmit a signal to the processor 7 based on a signal received from the management terminal 4.

The interface (I/F) 9 is an input and output interface of transmitting and receiving a signal between the processor 7 and the terminals 2a to 2e of the tenants and connecting he processor 7 to the terminals 2a to 2e. The interface (I/F) 9 may transmit a signal to a destination terminal among the terminals 2a to 2e based on a signal received from the processor 7. The interface (I/F) 9 may receive signals from the terminals 2a to 2e and transmit a signal to the processor 7 based on the signals received.

Next, operations of the information processing device 3 according to the embodiment are described.

FIG. 3 is a flowchart of the operations of the information processing device 3 according to the embodiment.

The processor 7 acquires information of resources requested for use by the tenants and causes the acquired information of the resources to be stored in the memory 5 (in S101). The information of the resources is information of constituent elements such as hardware, OSs, DBs, and applications, for example. The information of the resources requested for use by the tenants includes not only information of a resource selected when a new tenant applies for use of the cloud system infrastructure 1, but also information of a resource used by an existing tenant that has started using the cloud system infrastructure 1. An example of operations when information of OSs and applications is acquired as the information of the resources is described below.

Figures 4A, 4B:
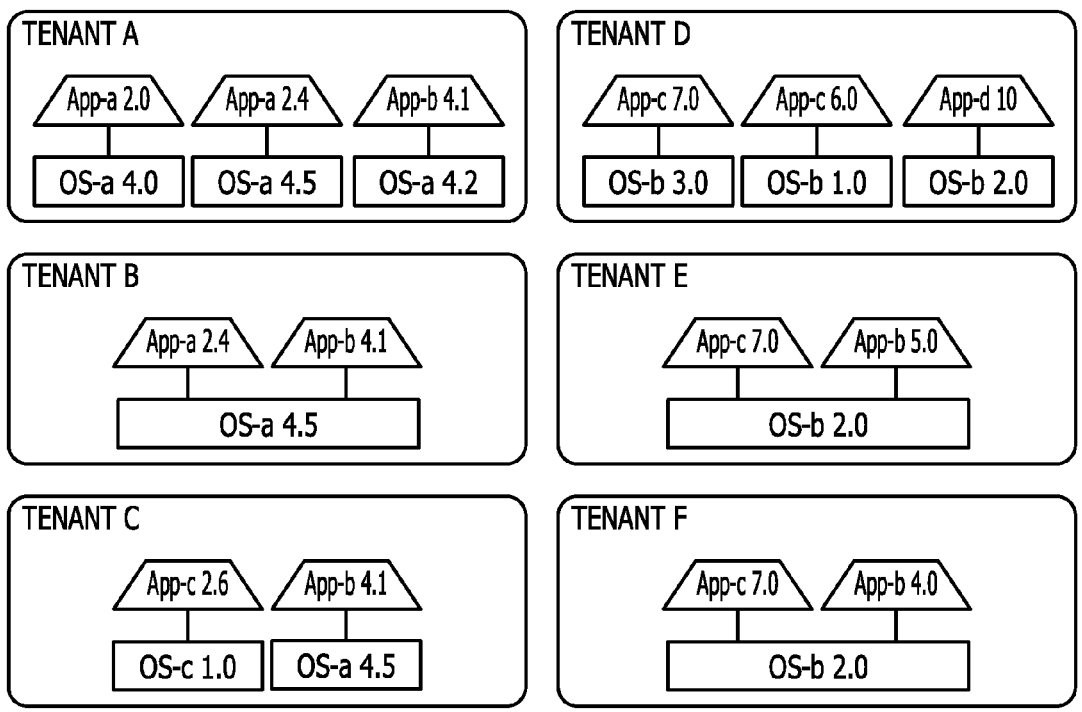
FIG. 4A is a diagram illustrating an example of resources requested for use by tenants.
FIG. 4B is a diagram illustrating an example of a data structure of resource information stored in a memory.

FIG. 4A is a diagram illustrating an example of the resources requested for use by the tenants. FIG. 4B is a diagram illustrating an example of a data structure of the information representing the resources and stored in the memory. In the example illustrated in FIG. 4A, the tenants that use the cloud system infrastructure 1 are tenants A, B, C, D, E, and F.

The tenant A requests use of a server that has a resource including OS-a 4.0 as an OS and App-a 2.0 as an application, a resource including OS-a 4.5 as an OS and App-a 2.4 as an application, and a resource including OS-a 4.2 as an OS and App-b 4.1 as an application. The tenant B requests use of a server that has a resource including OS-a 4.5 as an OS and App-a 2.4 as an application and a resource including OS-a 4.5 as an OS and App-b 4.1 as an application.

The tenant C requests use of a server that has a resource including OS-c 1.0 as an OS and App-c 2.6 as an application and a resource including OS-a 4.5 as an OS and App-b 4.1 as an application. The tenant D requests use of a server that has a resource including OS-b 3.0 as an OS and App-c 7.0 as an application, a resource including OS-b 1.0 as an OS and App-c 6.0 as an application, and a resource including OS-b 2.0 as an OS and App-d 10 as an application.

The tenant E requests use of a server that has a resource including OS-b 2.0 as an OS and App-c 7.0 as an application and a resource including OS-b 2.0 as an OS and App-b 5.0 an application. The tenant F requests use of a server that has a resource including OS-b 2.0 as an OS and App-c 7.0 as an application and a resource including OS-b 2.0 as an OS and App-b 4.0 as an application.

The numbers written on the right sides of the OSs and applications represent version numbers of the software. Regarding the same type of software, the larger the number, the newer the version. The resources of the tenants A, B, C, D, E, and F are not limited to the aforementioned resources.

FIG. 4B illustrates the combinations of the resources of the servers requested for use by the tenants or the combinations of the applications and the OSs for the tenants. In order to acquire information of the aforementioned resources, a method for receiving the information by requesting the information to the tenants that use the cloud system infrastructure 1 or a method for searching and extracting the information of the resources from information of contacts with tenants held by the information processing device 3 may be used. Alternatively, the memory 5 has, stored therein, the information of the resources, and the information of the resources may be acquired by requesting the latest information to only tenants for which time periods that elapse after the latest times of updating the stored information exceed a predetermined time period. According to this method, information may not be acquired from all the tenants upon the execution of the information processing program. Thus, the information of the resources may be efficiently acquired and a processing time may be reduced.

The information of the resources may be acquired when a new tenant applies for use of the cloud system infrastructure 1 or when the number of tenants exceed a certain number and cost-effectiveness is expected to be obtained by the sharing. Alternatively, the information of the resources may be acquired at regular or irregular time intervals. Alternatively, the information of the resources may be acquired when a request to reduce a cost of operating a server is received from a tenant or when a cost of operating the cloud system infrastructure 1 is to be reduced by a provider.

Return to FIG. 3. Subsequently, the processor 7 calculates similarities between the resources based on the acquired information of the resources (in S102). An example of a method for calculating the similarities is described with reference to FIGS. 5 and 6.

Figure 5:
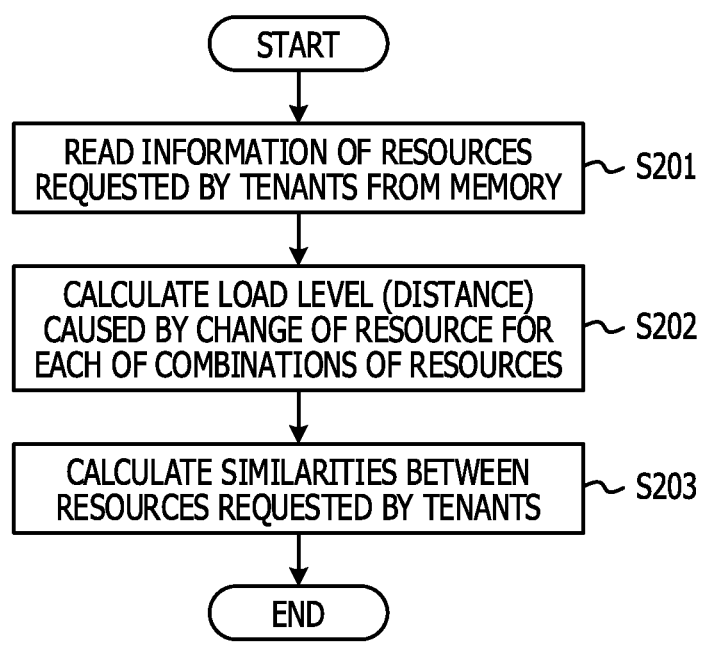
FIG. 5 is a flowchart of a process of calculating similarities.

FIG. 5 is a flowchart of a process of calculating the similarities.

The processor 7 reads, from the memory 5, the information of the resources requested for use by the tenants (in S201).

FIG. 6 is a diagram illustrating an example of corresponding relationships (load level information) between the types of operations of changing a resource and load levels representing loads caused by changes. Methods for changing a resource of a server include an upgrade, patch application, installation, a downgrade, and the like. The upgrade is a process of updating a version of software to a newer version (or writing the newer version over the older version). The patch application is a process of extracting only a part (difference information) called a patch file and to be changed, correcting a part of the program using the enumerated file, and thereby slightly upgrading the program. The installation is to newly install software in a computer and enable the software to be used. The downgrade is a process of updating a version of software to an older version.

Loads such as a cost caused by a change and a time period for the change vary depending on a method for changing a resource. Thus, in the example illustrated in FIG. 6, a load level is set as a value for each of the methods for changing a resource. The larger a value of a load level, the larger a load caused by a change. For example, a load caused by a change operation that is installation of an application or a downgrade of an application is larger than a load caused by a change operation that is an upgrade of an OS or application or patch application. A load caused by a change operation that is switching of OSs, a downgrade of an OS or a change of a DB is larger than a load caused by a change operation that is installation of an application or a downgrade of an application. According to a method for quantifying the levels of loads caused by changes, it is possible to quantitatively recognize how resources of servers are changed with small loads. Thus, the sharing may be efficiently executed. In the embodiment, a load level that represents a load caused by a change is referred to as a "distance". The information illustrated in FIG. 6 is registered in the memory 5 or 6 in advance. Information may be added to the information illustrated in FIG. 6. The information illustrated in FIG. 6 may be changed.

Return to FIG. 5. Subsequently, the processor 7 calculates a distance for each of combinations of resources before changes and resources after the changes (in S202).

Figure 7:
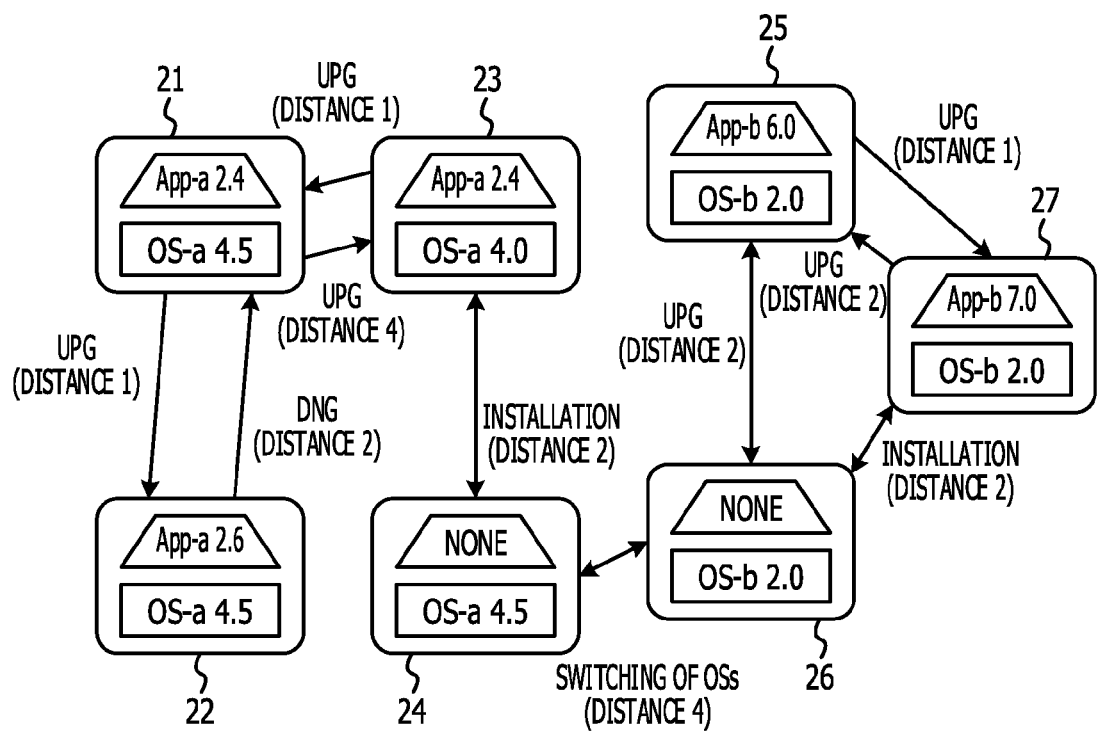
FIG. 7 is a state transition diagram illustrating an example of resources requested for use by tenants.

FIG. 7 is a state transition diagram illustrating an example of the resources requested for use by the tenants. FIG. 7 illustrates results of calculating, based on the load level information illustrated in FIG. 6, distances caused by changes of resources 21, 22, 23, 24, 25, 26, and 27 to other resources. Resources from which arrows extend represent resources before the changes, while resources to which the arrows extend represent resources after the changes. Each of arrows that point both directions represents that a distance caused by a change of a certain resource to another resource is the same as a distance caused by a change of the other resource to the certain resource. In FIG. 7, UPG represents an upgrade and DNG represents a downgrade.

A method for calculating a distance caused by a change of the resource 21 to the resource 22 is described below.

As illustrated in FIG. 7, the resource 21 includes OS-a 4.5 as an OS and App-a 2.4 as an application. The resource 22 includes OS-a 4.5 as an OS and App-a 2.6 as an application. Since the type of the OS of the resource 21 before the change is the same as the type of the OS of the resource 22 after the change, the OS is not changed. Thus, referring to FIG. 6, a distance related to the OS is 0. The types of the applications of the resources 21 and 22 are the same, while the versions of the applications of the resources 21 and 22 are different from each other and are 2.4 and 2.6, respectively. Since the version of the application of the resource 22 is newer than the version of the application of the resource 21, the application is changed by upgrading. Referring to FIG. 6, a distance caused by upgrading an application is 1. Thus, the distance caused by the change from the resource 21 to the resource 22 is calculated by summing the distance related to the OS and the distance related to the applications or is calculated to be 0+1=1.

Next, a method for calculating a distance caused by a change in a direction opposite to the aforementioned direction or by the change from the resource 22 to the resource 21 is described.

Since the type of the OS of the resource 21 before the change is the same as the type of the OS of the resource 22 after the change, the OS is not changed. Referring to FIG. 6, a distance related to the OS is 0. The types of the applications of the resources 21 and 22 are the same, while the versions of the applications of the resources 21 and 22 are different from each other and are 2.4 and 2.6, respectively. Since the version of the application of the resource 21 is older than the version of the application of the resource 22, the application is changed by downgrading. Referring to FIG. 6, a distance caused by downgrading an application is 2. Thus, the distance caused by the change from the resource 22 to the resource 21 is calculated by summing the distance related to the OS and the distance related to the applications or is calculated to be 0+2=2. When the distances are compared with each other, the load caused by the change from the resource 21 to the resource 22 is smaller than the load caused by the change from the resource 22 to the resource 21. It is apparent that distances may be different depending on a change from a certain resource to another resource and a change from the other resource to the certain resource.

As another example, a method for calculating a distance caused by a change from the resource 23 to the resource 24 is described below. The resource 23 includes OS-a 4.0 as an OS and App-a 2.4 as an application. The resource 24 includes OS-a 4.5 as an OS and no application installed. Since the type of the OS of the resource 23 before the change is the same as the type of the OS of the resource 24 after the change, the OS is not changed. Referring to FIG. 6, a distance related to the OS is 0. The resource 24 after the change does not include an application installed. Thus, the application is changed by uninstalling the application. Thus, referring to FIG. 6, a distance caused by the change of the application is 2. Thus, the distance caused by the change from the resource 23 to the resource 24 is calculated by summing the distance related to the OS and the distance related to the application or is calculated to be 0+2=2.

Next, a method for calculating a distance caused by a change in a direction opposite to the aforementioned direction or by the change from the resource 24 to the resource 23 is described. Since the type of the OS of the resource 23 before the change is the same as the type of the OS of the resource 24 after the change, the OS is not changed. Referring to FIG. 6, a distance related to the OS is 0. The resource 24 does not include an application installed. Thus, the application is changed by installing the application. Referring to FIG. 6, a distance caused by the change of the application is 2. Thus, the distance caused by the change from the resource 24 to the resource 23 is calculated by summing the distance related to the OS and the distance related to the application or is calculated to be 0+2=2. In the embodiment, it is apparent that distances may be the same regardless of changes of resources and that a load caused by a change from a certain resource to another resource and a load caused by a change from the other resource to the certain resource may not be substantially different.

According to the embodiment, values that represent loads caused by changes and correspond to the types of methods for changing a resource are set, values are assigned to each of combinations of resources included in a server before changes and resources included in a server after the changes and are summed. According to this method, it is possible to quantitatively recognize that a load caused by the sharing is reduced by selecting a certain resource to be changed and a resource to which the certain resource is to be changed.

Return to FIG. 5. Subsequently, the processor 7 calculates similarities between the resources requested for use by the tenants (in S203). The similarities between the resources requested for use by the tenants may be calculated according to Equation (1).

$$Dis(T_m, T_n) = \sum_i \min_j \ (D(C_{(T_m,i)}, C_{(T_n,j)}));$$ Equation (1)

In Equation (1), $Dis(T_m, T_n)$ represents a distance between tenants $T_m$ and $T_n$. $Dis(T_m, T_n)$ represents a similarity between a resource to be used by the tenant $T_m$ and a resource to be used by the tenant $T_n$ in a case where the resource to be used by the tenant $T_m$ is changed to the resource to be used by the tenant $T_n$. $C(T_m, i)$ represents an i-th resource (an application and an OS) of the tenant $T_m$. $D(C(T_m, i), C(T_n, j))$ represents a distance between the resource $C(T_m, i)$ and a resource $C(T_n, j)$. $D(C(T_m, i), C(T_n, j))$ represents a similarity between the resource $C(T_m, i)$ and the resource $C(T_n, j)$ in a case where the resource $C(T_m, i)$ is changed to the resource $C(T_n, j)$.

Figure 8:
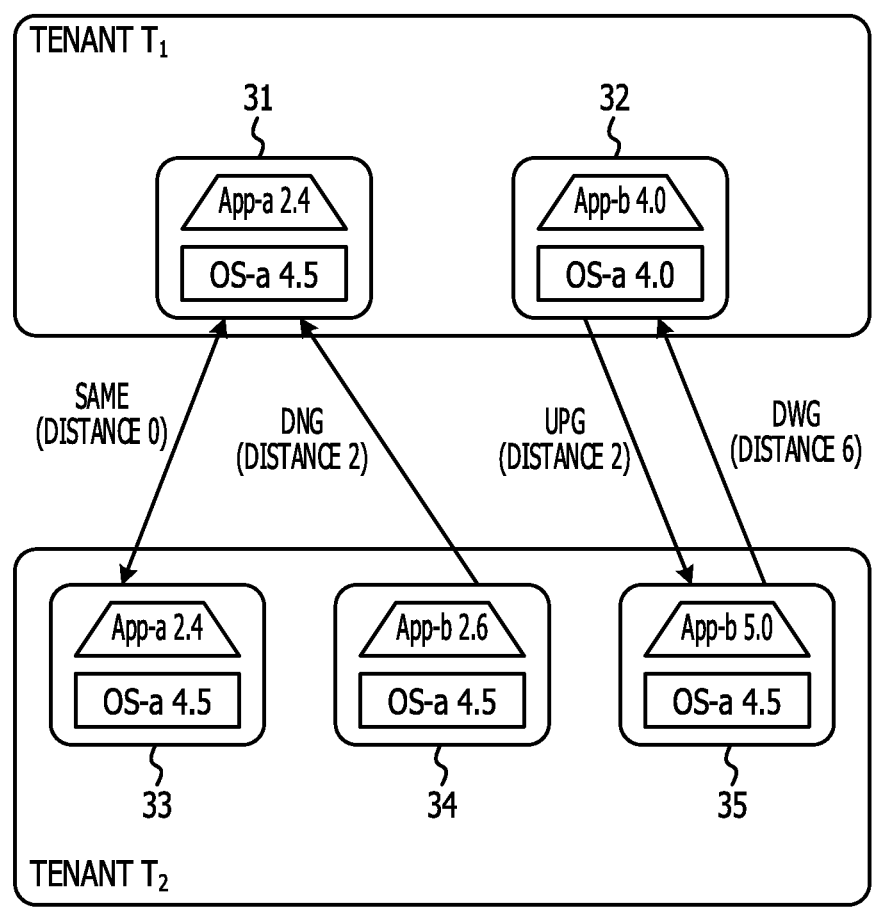
FIG. 8 is a diagram illustrating an example of the calculation of distances between resources used by a tenant and resources used by another tenant.

FIG. 8 illustrates an example in which a distance between a resource to be used by a tenant $T_1$ and a resource to be used by a tenant $T_2$ is calculated. As illustrated in FIG. 8, the resource to be used by the tenant $T_1$ includes two resources 31 and 32, while the resource to be used by the tenant $T_2$ includes three resources 33, 34, and 35. Each of arrows illustrated in FIG. 8 points from a resource of the tenant $T_1$ or $T_2$ to a resource of the other tenant $T_1$ or $T_2$ so as to ensure that the resources cause a distance between the resources to be smallest. Numbers within parentheses represent loads caused by changes.

A distance caused by a change from the tenant $T_1$ to the tenant $T_2$ may be calculated as follows, for example. When each of the resources 31 and 32 of the tenant $T_1$ is to be changed to any of the resources of the tenant $T_2$, resources that cause distances from the resources 31 and 32 to be smallest are searched from the resources 33, 34, and 35. As illustrated in FIG. 8, a resource that causes a distance between the resource and the resource 31 to be smallest is the resource 33 (the distance between the resources 31 and 33 is 0). A resource that causes a distance between the resource and the resource 32 is the resource 35 (the distance between the resources 32 and 35 is 2). Thus, a similarity $D_{dis}$ ($T_1$, $T_2$) between the tenants $T_1$ and $T_2$ when the tenant $T_1$ is changed to the tenant $T_2$ is calculated according to Equation (1) by summing the two distances or calculated to be 0+2=2.

A distance caused by a change from the tenant $T_2$ to the tenant $T_1$ may be calculated as follows, for example. When each of the resources 33, 34 and 35 of the tenant $T_2$ is to be changed to any of the resources of the tenant $T_1$, resources that cause distances from the resources 33, 34, and 35 to be smallest are searched from the resources 31 and 32. As illustrated in FIG. 8, a resource that causes a distance between the resource and the resource 33 to be smallest is the resource 31 (the distance between the resources 31 and 33 is 0). A resource that causes a distance between the resource and the resource 34 is the resource 31 (the distance between the resources 31 and 34 is 2). A resource that causes a distance between the resource and the resource 35 is the resource 32 (the distance between the resources 32 and 35 is 6). Thus, a similarity $D_{dis}$ ($T_2$, $T_1$) between the tenants $T_2$ and $T_1$ when the tenant $T_2$ is changed to the tenant $T_1$ is calculated according to Equation (1) by summing the three distances or calculated to be 0+2+4=6.

FIG. 9 is a diagram illustrating an example of results of calculating similarities between resources requested for use by the tenants A, B, C, D, E, and F illustrated in FIG. 4. In FIG. 9, symbols A to F written along vertical lines represent the tenants that use resources before changes, while symbols A to F written along horizontal lines represent the tenants that use resources after the changes. As a value that represents a similarity is reduced, the similarity becomes higher and a load caused by a change is reduced. When a tenant that uses a resource before a change is the same as a tenant that uses a resource after the change, the tenant is not changed and "–" is illustrated in FIG. 9. In the example illustrated in FIG. 9, when a tenant that uses a resource before a change is the tenant C, and a tenant that uses a resource after the change is the tenant E, a similarity between the tenants C and E is 12.

When the process of S203 is terminated, the processor 7 determines, based on the similarities calculated, target tenants that are tenants related to the sharing (in S103).

In S103, the processor 7 sets a threshold for the similarities. Then, the processor 7 extracts, from the information illustrated in FIG. 9, a combination of tenants between which a similarity is lower than the set threshold. FIGS. 10A, 10B, and 10C illustrate examples of the extraction of the combination of the tenants targeted for the sharing. In the embodiment, the threshold for the similarities is set to 10. As illustrated in FIG. 10A, combinations of tenants that request use of certain resources to be aggregated and tenants that request use of resources into which the certain resources are to be aggregated are extracted so as to ensure that thresholds for similarities between the tenants are less than 10. Numbers surrounded by circles represent the thresholds of less than 10. Thus, the tenants A, B, C, E, and F are determined as tenants targeted for the sharing.

Return to FIG. 3. Subsequently, a similar resource is determined and an operation cost is calculated (in S104).

The similar resource is a resource that may be shared by multiple tenants and is a candidate resource to be shared. For example, the similar resource includes a part of an existing resource already used by the multiple tenants. It is preferable that the similar resource be similar to a configuration of a resource requested by the tenants as much as possible.

Figure 11:
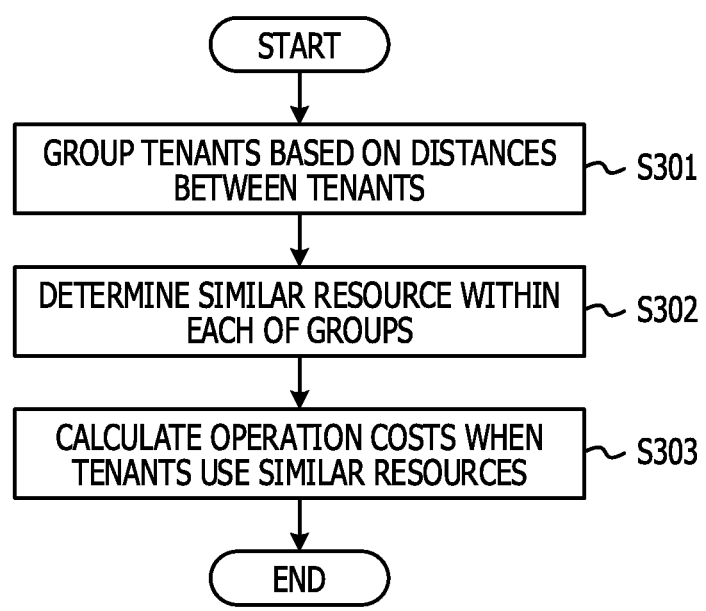
FIG. 11 is a flowchart of an example of a process of determining similar resources and calculating operation costs.

An example of a method for determining a similar resource and a method for calculating an operation cost is described with reference to FIGS. 10A, 10B, 10C, and 11. FIG. 11 is a flowchart of an example of a process of determining a similar resource and calculating an operation cost.

First, the tenants are grouped based on the calculated distances between the tenants (in S301). Referring to FIG. 10A, the tenants A, B, and C may be grouped into a single group. The tenants E and F may be grouped into a single group.

Subsequently, a similar resource within each of the groups is determined (in S302). FIGS. 10B and 10C are state transition diagrams illustrating examples of the combinations of the tenants extracted and targeted for the sharing. In FIGS. 10B and 10C, blocks from which arrows extend represent tenants that request use of certain resources to be aggregated, while blocks to which the arrows extend represent tenants that request use of resources into which the certain resources are to be aggregated.

The similar resource may be determined as follows, for example.

Referring to FIG. 10B, a resource that is among resources requested for use by the tenants A, B, and C and into which resources are to be aggregated with a small load is determined using similarities.

If resources of the tenants B and C are aggregated into a resource of the tenant A, a similarity corresponding to a change from the resource of the tenant B to the resource of the tenant A is 4. However, a similarity corresponding to a change from the resource of the tenant C to the resource of the tenant A is a value (similarity of 10) equal to the threshold and is not extracted. Thus, a method for aggregating the resources of the tenants B and C into the resource of the tenant A is excluded from candidates for the method for determining the similar resource.

If the resources of the tenants A and C are aggregated into the resource of the tenant B, a similarity corresponding to a change from the resource of the tenant A to the resource of the tenant B is 3. A similarity corresponding to a change from the resource of the tenant C to the resource of the tenant B is 6. Thus, if the resources of the tenants A and C are aggregated into the resource of the tenant B, the sum of the similarities are calculated to be 3+6=9.

If the resources of the tenants A and B are aggregated into the resource of the tenant C, a similarity corresponding to a change from the resource of the tenant A to the resource of the tenant C is 6. A similarity corresponding to a change from the resource of the tenant B to the resource of the tenant C is 6. Thus, if the resources of the tenants A and B are aggregated into the resource of the tenant C, the sum of the similarities are calculated to be 6+6=12.

The sums of the similarities are compared based on the calculated results. Then, the method that causes the sum of the similarities to be smallest and is to aggregate the resources of the tenants A and C into the resource of the tenant B is determined as the method for determining the similar resource.

Referring to FIG. 10C, a resource that is among resources of the tenants E and F and into which a resource is to be aggregated with a smaller load is determined using similarities.

If the resource of the tenant E is aggregated into the resource of the tenant F, a similarity corresponding to a change from the resource of the tenant E to the resource of the tenant F is 2. If the resource of the tenant F is aggregated into the resource of the tenant E, a similarity corresponding to a change from the resource of the tenant F to the resource of the tenant E is 1. Thus, the method that causes the similarity to be smaller and is to aggregate the resource of the tenant F into the resource of the tenant E is determined as the method for determining the similar resource.

Figure 12:
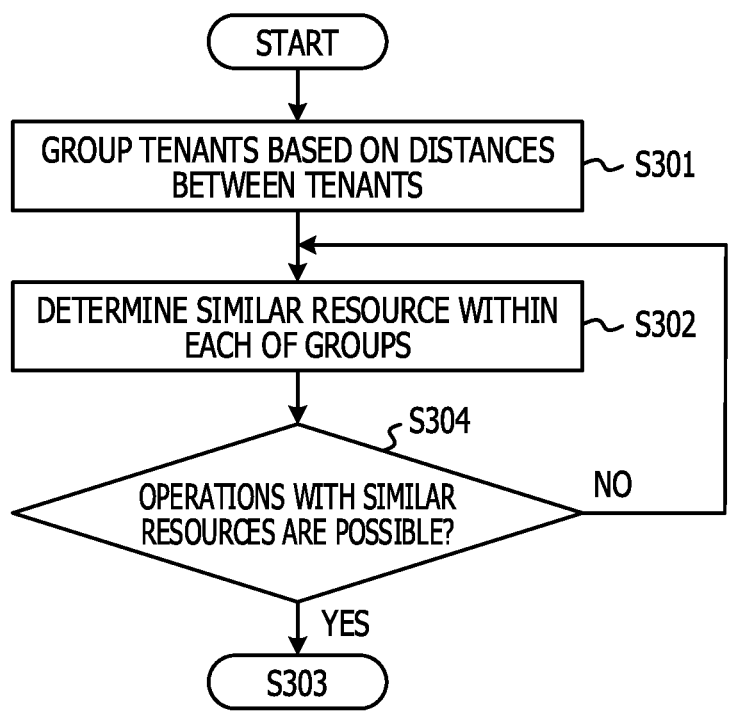
FIG. 12 is a flowchart of a modified example of the process of determining similar resources and calculating operation costs.

FIG. 12 is a flowchart of a modified example of the process of determining a similar resource and calculating an operation cost. A similar resource determined may cause a failure of an operation of a server. For example, if an OS is downgraded to an older version due to the execution of the sharing, and an application installed does not have compatibility with the OS of the older version, the application may not be executed and may cause a failure. In the modified example illustrated in FIG. 12, after a similar resource is determined, a process of determining whether or not an operation with the similar resource is possible is additionally executed.

Processes to be executed in S301 and S302 illustrated in FIG. 12 are the same as the processes to be executed in S301 and S302 illustrated in FIG. 11. After a similar resource within each of the groups is determined in S302, it is determined whether or not operations with the similar resources determined are possible (in S304). Whether or not the operations with the similar resources are possible is determined by searching information stored in the memory 5 and representing constraints for OS constituent elements and confirming whether or not the operations with the similar resources are possible, for example. If it is determined that the operations with the similar resources are possible (Yes in S304), the process proceeds to S303. If it is determined that an operation with any of the similar resources is not possible (No in S304), the process returns to S302 and the similar resource within an interested group is determined again.

By determining whether or not an operation with a similar resource is possible after determination of the similar resource, a resource that is not suitable for an operation may be removed. Thus, the accuracy of determining a similar resource may be improved.

Return to FIG. 11. An operation cost when the similar resource is used by a tenant is calculated (in S303).

The processor 7 calculates information on the cost of the operation with the similar resource based on information of the similar resource determined in S302 and information stored in the memory 5 and representing the costs of the operations with the resources.

First, an operation cost per tenant is described. For example, the operation cost c per tenant is expressed by Equation (2).

$$c = S + P \cdot \left(1 - \frac{n-1}{T}\right);$$ 
Equation (2)

In Equation (2), S is a fixed cost per tenant, $P \times (1-(n-1)/T)$ is a variable cost that varies due to sharing of a resource, P is the maximum value of the variable cost per tenant, T is the total number of tenants, and n is the number of tenants that share the resource.

For example, when all 100 tenants separately use different resources, T=100 and n=1. When T=100, n=1, and T and n are substituted into Equation (2), an operation cost $c_{silo}$ is expressed by Equation (3) and is maximal.

$$c_{silo} = S + P$$ 
Equation (3);

For example, when all the 100 tenants shares a single resource, T=100 and n=100. When T=100, n=100, and T and n are substituted into Equation (2), an operation cost $c_{share}$ is expressed by Equation (4) and is minimal.

$$c_{share} = S + \frac{P}{100};$$ 
Equation (4)

The amount (reduction effect) $c_{silo} - c_{share}$ of a reduction, caused by the execution of the sharing, in the cost of an operation with the resources may be calculated according to Equation (5) using Equations (3) and (4).

$$c_{silo} - c_{share} = 0.99 \cdot P$$ 
Equation (5);

Then, an operation cost $c_{(A, B, C)}$ when the resources of the tenants A and C are aggregated into the resource of the tenant B is calculated. In this case, the three tenants among the six tenants share the resource. Thus, when T=6, n=3, and T and n are substituted into Equation (2), the operation cost $c_{(A, B, C)}$ may be calculated according to Equation (6).

$$c_{(A,B,C)} = S + \tfrac{2}{3} \cdot P$$ 
Equation (6);

The amount $c_{silo} - c_{(A, B, C)}$ of a reduction, caused by the execution of the sharing, in the operation cost may be calculated according to Equation (7) using Equations (3) and (6).

$$c_{silo} - c_{(A,B,C)} = \tfrac{1}{3} \cdot P$$ 
Equation (7);

An operation cost $c_{(E, F)}$ when the resource of the tenant E or F is aggregated into the resource of the other tenant E or F is calculated. In this case, the two tenants among the six tenants share the resource. Thus, when T=6, n=2, and T and n are substituted into Equation (2), the operation cost $c_{(E, F)}$ may be calculated according to Equation (8).

$$c_{(E,F)} = S + \tfrac{5}{6} \cdot P$$ 
Equation (8);

The amount $c_{silo} - c_{(E, F)}$ of a reduction, caused by the execution of the sharing, in the operation cost may be calculated according to Equation (9).

$$c_{silo} - c_{(E,F)} = \tfrac{1}{6} \cdot P$$ 
Equation (9);

The actual operation costs expressed by Equations (2) to (9) may be calculated by acquiring values of S and P from the information, stored in the memory 5, of the costs of the operations with the resources and substituting the acquired values into Equations (2) to (9).

When S303 is terminated, the generated information (resource information) of the similar resource and information of the cost of an operation with the similar resource are presented to the target tenants (in S105).

In this case, an operation cost when a resource requested by the target tenants is used, and an operation cost when the similar resource is used, may be presented. Alternatively, the amount of a reduction, caused by the use of the similar resource instead of the resource requested for use by the target tenants, in the operation cost may be presented. The amount of the reduction in the operation cost is the difference between the operation cost when the resource requested by the tenants is used and the operation cost when the similar resource is used. Alternatively, the operation costs and the amount of the reduction in the operation cost may be presented.

In S105, the processor 7 transmits, to the interface (I/F) 9 included in the information processing device 3, a signal to instruct the interface (I/F) 9 to transmit, to terminals owned by the target tenants, the information of the similar resource and the information on the cost, calculated in S303, of the operation with the similar resource. The interface (I/F) 9 transmits, based on the signal received from the processor 7, the signal including the information of the similar resource and the information of the amount of the reduction in the cost of the operation with the similar resource to the terminals that are among the terminals 2a to 2e and owned by the target tenants.

Figure 13:
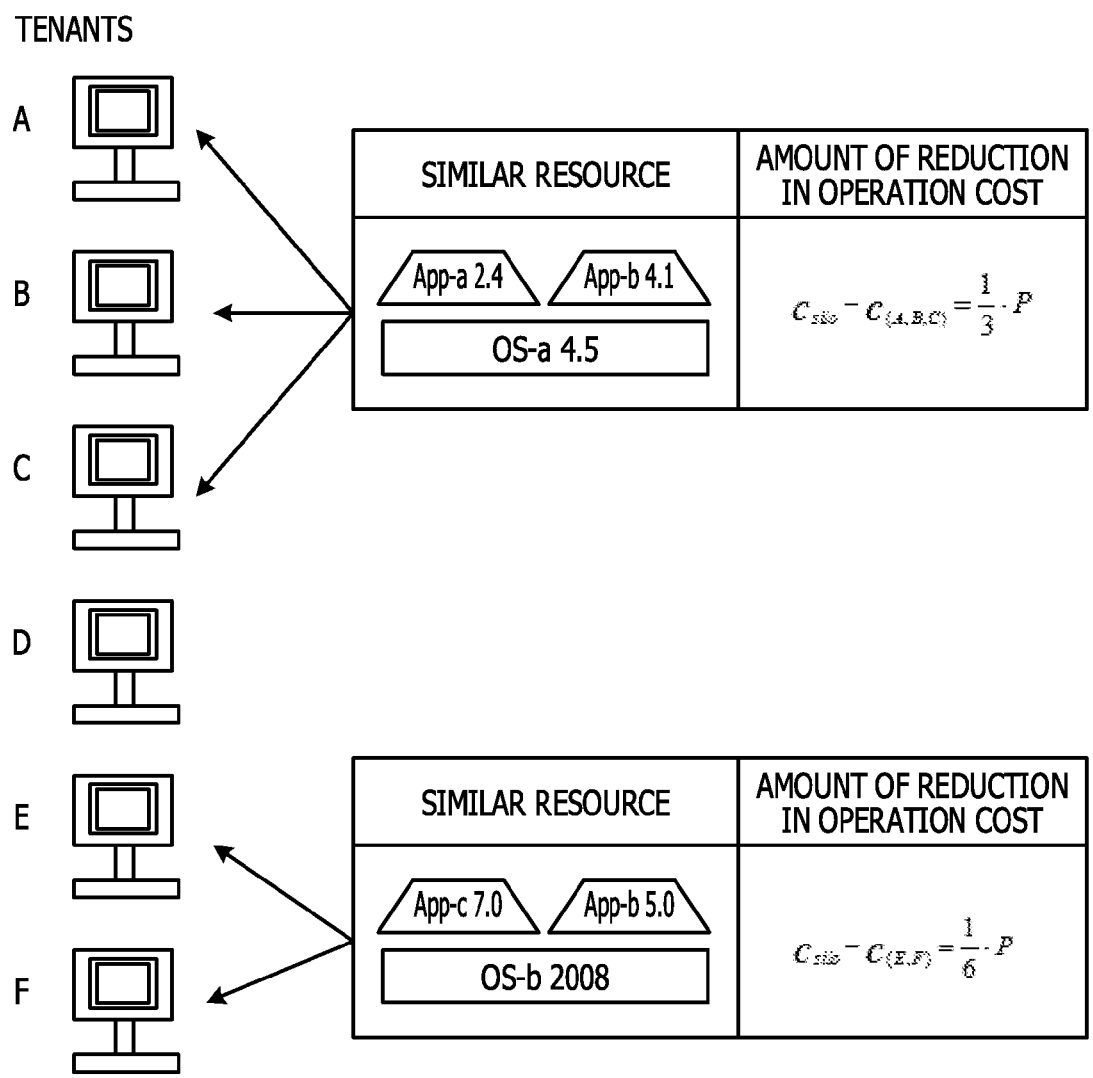
FIG. 13 is a diagram illustrating an example of presenting, to the target tenants, information of the similar resources and the operation costs when the similar resources are used.

FIG. 13 is a diagram illustrating an example in which the information of the similar resource and the information of the cost of the operation with the similar resource are presented to the target tenants. FIG. 13 illustrates the example in which the amount of a reduction in an operation cost is presented as the information of the cost of the operation with the similar resource.

As illustrated in FIG. 13, the information processing device 3 transmits, to the terminals 2a, 2b, and 2c of the tenants A, B, and C, information related to a similar resource and to be used to aggregate the resources of the tenants A and C into the resource of the tenant B and information of the amount ($c_{silo}-c_{(A, B, C)}=(\frac{1}{3})\times P$) of the reduction, obtained upon the execution of the similar resource, in the cost of the operation with the resources. The information processing device 3 presents, to the tenants E and F, information related to a similar resource and to be used to aggregate the resource used by the tenant F into the resource used by the tenant E and information of the amount ($c_{silo}-c_{(E, F)}=(\frac{1}{6})\times P$) of a reduction, obtained upon the execution of the sharing, in a cost of an operation with the resources. Since the tenant D is not a target tenant, the information processing device 3 does not transmit the aforementioned information to the terminal 2d of the tenant D.

In this manner, the difference between an operation cost when a resource requested by target tenants is used and an operation cost when a similar resource is used is presented to the target tenants. Thus, the target tenants obtain, as an option, the resource similar to the requested resource and may quantitatively recognize a cost advantage caused by the use of the similar resource. Thus, the target tenants may easily determine whether to use the requested resource or the similar resource.

Subsequently, the target tenants, which receive the information on the similar resource and the information of the amount of the reduction in the cost of the operation with the resources, determine whether to approve the use of the similar resource while comparing costs caused by the change of the resources with the cost advantage. If the target tenants approve the use of the similar resource, terminals owned by the target tenants transmit, to the interface (I/F) 9, a signal representing that the target tenants approve the use of the similar resource. If the target tenants do not approve the use of the similar resource, the terminals owned by the target tenants transmit, to the interface (I/F) 9, a signal representing that the target tenants do not approve the use of the similar resource.

Return to FIG. 3. Subsequently, the processor 7 determines whether or not all the target tenants approve the use of the similar resource (in S106). If the processor 7 determines that all the target tenants approve the use of the similar resource (Yes in S106), the processor 7 transmits, to the interface (I/F) 8, a signal to instruct to share the interested resource. The interface (I/F) 8 transmits, to the management terminal 4 included in the cloud system infrastructure 1, a signal to instruct to transition to the sharing. The management terminal 4 receives the signal to instruct to transition to the sharing and execute the sharing such as an upgrade or installation in an interested server among the servers 1a to 1d.

If the processor 7 determines that any of the target tenants does not approve the use of the similar resource (No in S106), the processor 7 excludes, from the target tenants, the tenant that does not approve the use of the similar resource (in S108). After that, the processor 7 determines whether or not target tenants exist (in S109). If the processor 7 determines that the target tenants do not exist (No in S109), the processor 7 terminates the process since the sharing is not executed. If the processor 7 determines that the target tenants exist (Yes in S109), the process returns to S104, and the processor 7 determines a resource similar to resources used by the remaining tenants and calculates a cost advantage again.

In this manner, the processor 7 excludes, from target tenants, a tenant that does not approve the use of a similar resource, and the processor 7 repeats the process until all target tenants approve the use of the similar resource. Thus, the sharing may be executed by a method optimal for the target tenants after all the target tenants approve the use of the similar resource.

Even if the provider presents information of a similar resource to target tenants, the provider may not immediately obtain answers from the target tenants. Especially, if the provider obtains approval results from almost all tenants to which the information of the similar resource has been presented, and the provider does not obtain an approval result from a part of the target tenants, the sharing is delayed while not being executed. Thus, a tenant determined whether to approve the use of a similar resource may face a disadvantage and the amount of a reduction in an operation cost may change due to a change of market conditions. Thus, before the information processing device 3 transmits information of a similar resource to target tenants, it is preferable that a predetermined time period after the transmission of the information be set as a time period for an answer.

Figure 14:
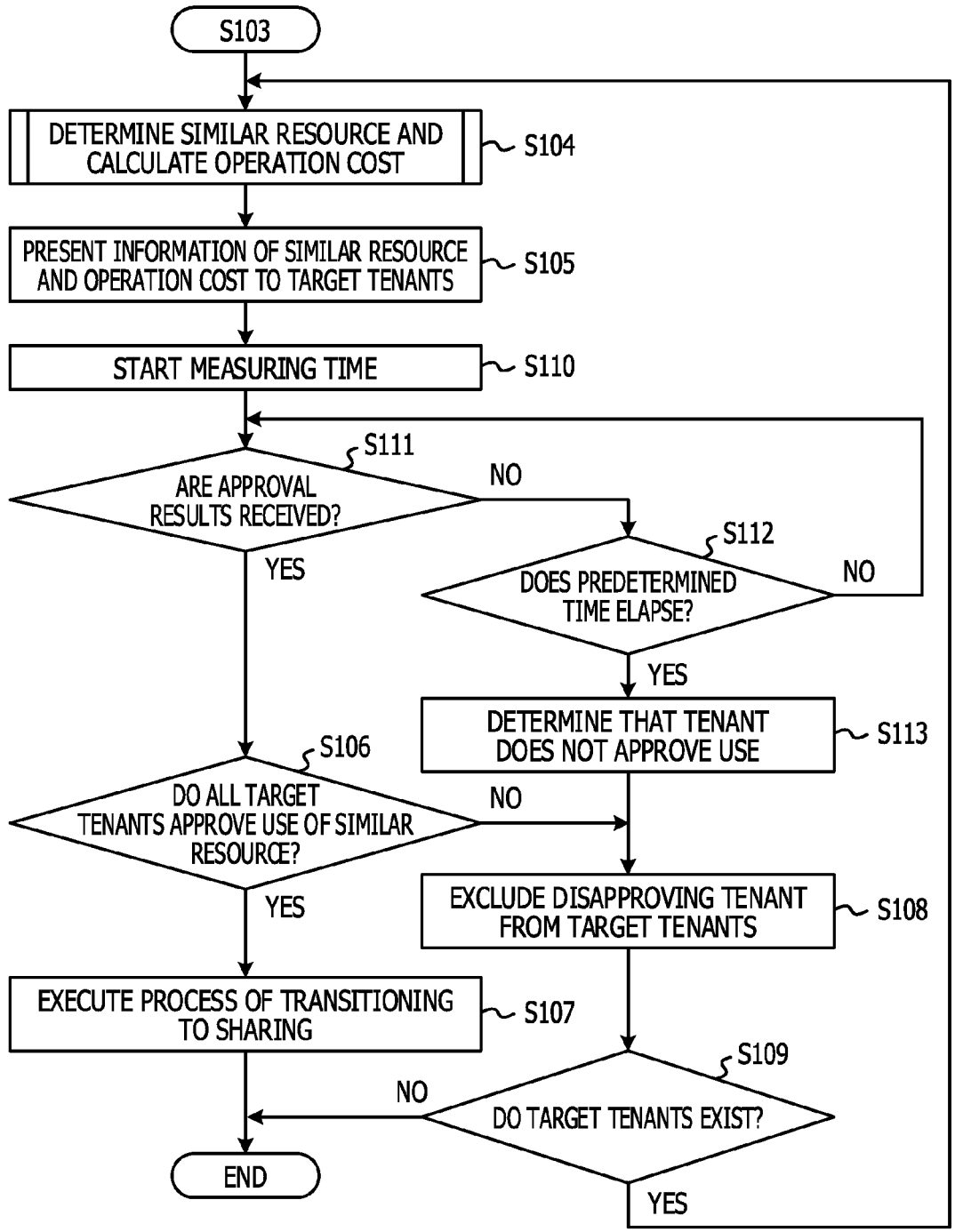
FIG. 14 is a flowchart of a modified example of operations of the information processing device according to the embodiment.

FIG. 14 is a flowchart of a modified example of operations of the information processing device according to the embodiment. In the example illustrated in FIG. 14, processes to be executed before S105 are the same as the processes illustrated in FIG. 3. A time is measured while a time when the information of the similar resource and the information of the operation cost when the similar resource is used are transmitted in S105 is treated as a start time (in S110). In S110, a clock or the like that is included in the processor 7 may measure the time.

Subsequently, the processor 7 determines whether or not the processor 7 has received approval results from the terminals of the target tenants (in S111). If the processor 7 has received the approval results from the terminals of the target tenants (Yes in S111), the process proceeds to S106. If the processor 7 determines that the processor 7 does not receive the approval result from a terminal of any of the target tenants (No in S111), the processor 7 determines whether or not a predetermined time period elapses after the transmission (S112). If the processor 7 determines that the predetermined time period elapses after the transmission (Yes in S112), the processor 7 determines that the interested target tenant does not approve the use of the similar resource (in S113). If the processor 7 determines that the predetermined time period does not elapse after the transmission (No in S112), the process returns to S111.

In this manner, the predetermined time period after transmission is set as the time period for an answer, a target tenant that does not provide an approval result within the time period for an answer is treated as a disapproving tenant and excluded from target tenants, and the determination of a resource that is similar to a resource used by remaining tenants is quickly promoted. Thus, a delay of the sharing may be suppressed.

Figure 15:
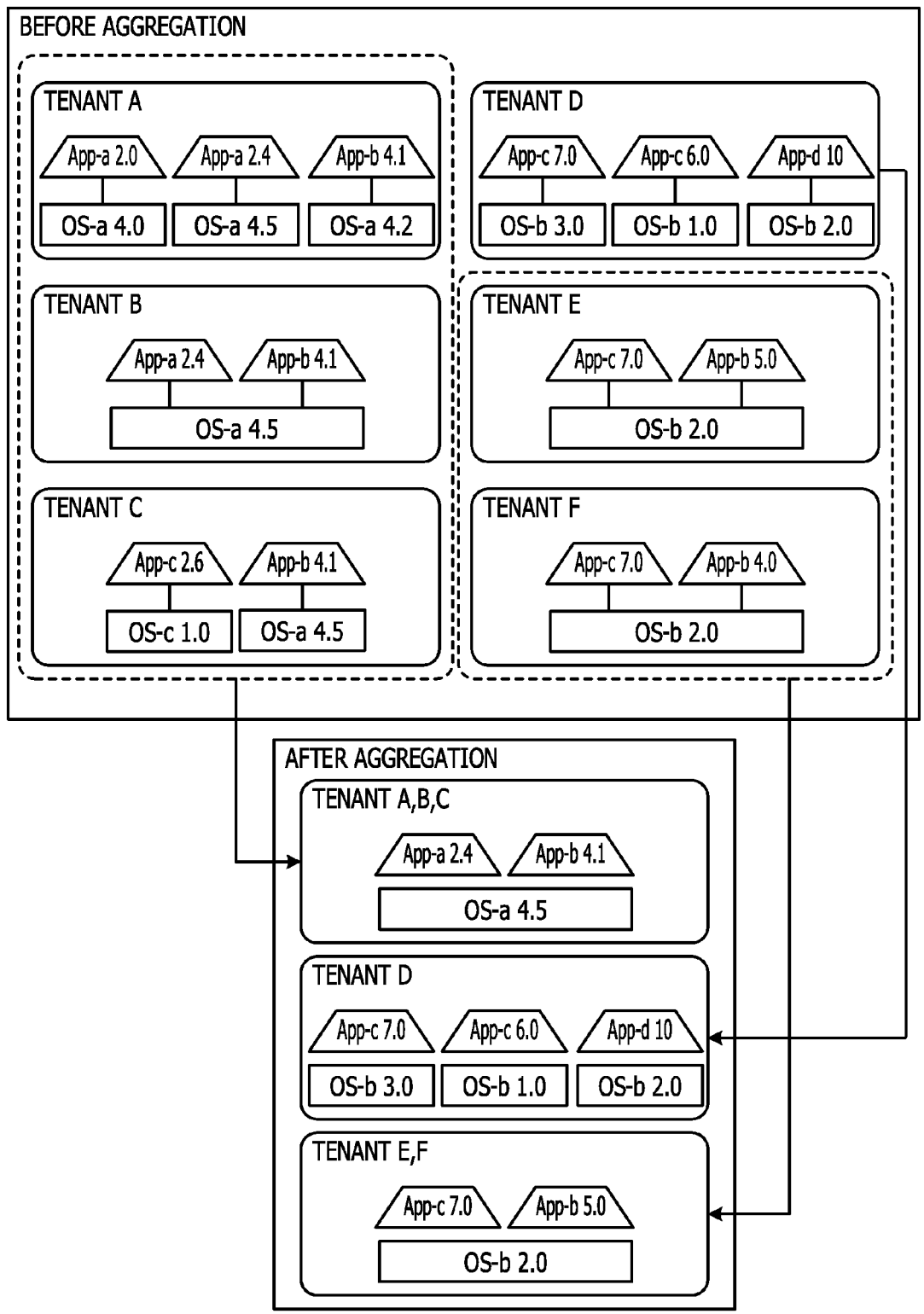
FIG. 15 is a diagram illustrating an example of resources before the execution of the sharing and resources after the execution of the sharing.

FIG. 15 is a diagram illustrating an example of resources before the execution of the sharing and resources of after the execution of the sharing. As illustrated in FIG. 15, after the sharing, the tenants A, B, and C use a server that has a resource including OS-a 4.5 as an OS and App-a 2.4 as an application and a resource including OS-a 4.5 as an OS and App-b 4.1 as an application. Since the tenant D is not a tenant targeted for the sharing, a resource of the tenant D is not changed. After the sharing, the tenants E and F use a server that has a resource including OS-b 2.0 as an OS and App-b 7.0 as an application and a resource including OS-b 2.0 as an OS and App-b 5.0 as an application. In this manner, the tenants A, B, and C may reduce a resource by the sharing.

FIG. 16 is a diagram illustrating results of calculating, based on the example illustrated in FIG. 15, the numbers of constituent elements of resources before and after the execution of the sharing and the numbers of types of the constituent elements of the resources before and after the execution of the sharing. Aggregation ratios illustrated in FIG. 16 are defined as ratios of the numbers before the aggregation to the numbers after the aggregation. The smaller the aggregation ratios illustrated in FIG. 16, the larger effects of the aggregation. As illustrated in FIG. 16, the number of constituent elements and the number of types of the constituent elements may be reduced by the execution of the sharing. It is apparent that the aggregation effect corresponding to the numbers of the constituent elements before and after the execution of the sharing is larger than the aggregation effect corresponding to the numbers of the types of the constituent elements before and after the execution of the sharing. Thus, an operation cost may be reduced while the complexity and scale of a system are suppressed.

According to the embodiment, a similar resource is determined based on similarities calculated based on information of resources. Then, a cost of an operation with the similar resource determined is calculated, and information of the similar resource and information on the cost of the operation with the similar resource are presented to target tenants. Thus, an architecture of cloud computing may be efficiently, flexibly used by the provider and the tenants. Specifically, the provider obtains approval from tenants, and an architecture of a server installed in a data center may be simplified. As a result, the complexity of the server may be improved, and an operation cost per tenant may be reduced. In addition, each tenant may recognize an advantage provided by the provider and select a resource. Thus, the flexibility of the selection may be obtained.

Figure 17A:
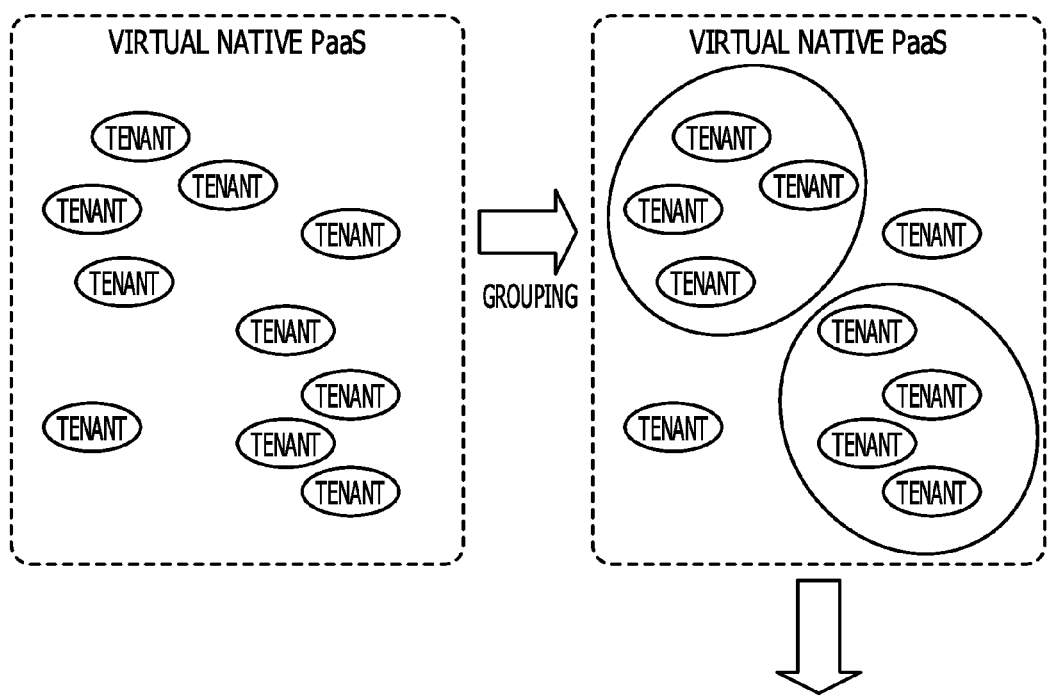
FIGS. 17A and 17B are diagrams illustrating an example of the type of a multi-tenant architecture that is achieved in the embodiment.
Figure 17B:
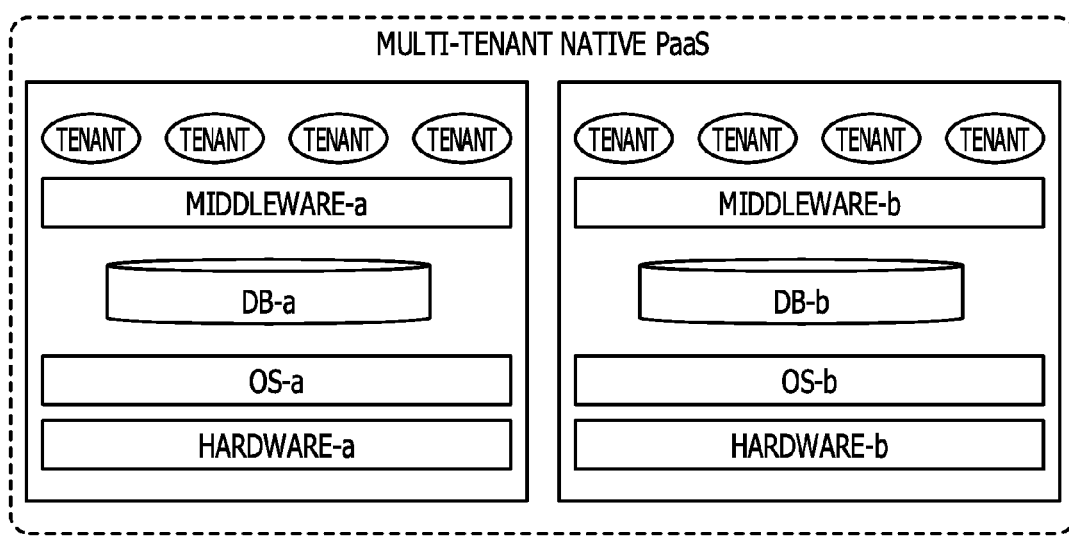

FIGS. 17A and 17B are diagrams illustrating an example of the type of a multi-tenant architecture that is achieved in the embodiment. FIG. 17B illustrates a configuration including a plurality of multi-tenant native PaaSs. The configuration illustrated in FIG. 17B is achieved by grouping and aggregating resources that are the same as or similar to each other or and are included in servers used by tenants and forming the plurality of multi-tenant native PaaSs that are relatively small, as illustrated in FIG. 17A.

Figure 18A:
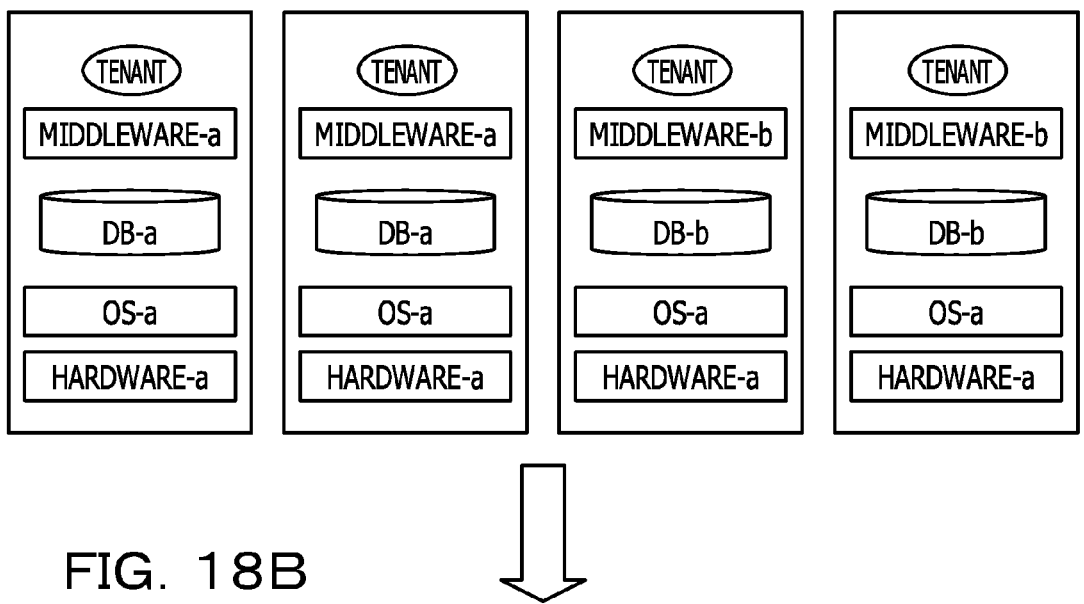
FIGS. 18A and 18B are diagrams illustrating another example of the type of the multi-tenant architecture that is achieved in the embodiment.
Figure 18B:
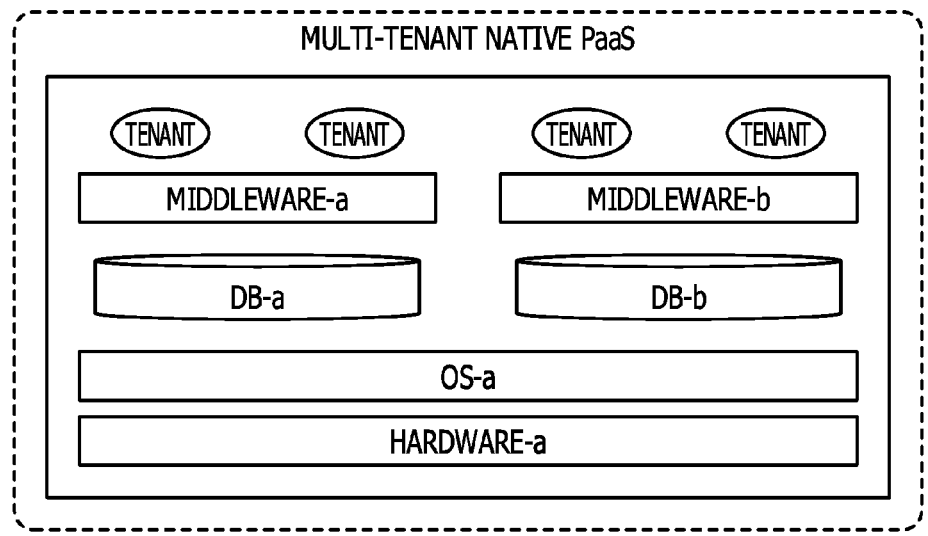

FIGS. 18A and 18B are diagrams illustrating another example of the type of the multi-tenant architecture that is achieved in the embodiment. FIG. 18B illustrates a configuration in which all tenants do not use a single multi-tenant native PaaS and share only a part of resources. This configuration illustrated in FIG. 18B is achieved by extracting the part to be shared from resources used by the tenants so as to share the part and cause the configuration to form a single architecture while referencing a configuration illustrated in FIG. 18A.

Although the embodiment is described above, the techniques disclosed herein are not limited to the specific embodiment and may be modified or changed in various manners. FIGS. 19A and 19B are diagrams illustrating modified examples of the definition of distances between resources. In the embodiment, load levels that represent loads caused by changes of resources are used as distances. As illustrated in FIG. 19A, however, costs for changes of resources may be expressed by distances. In addition, as illustrated in FIG. 19B, times (numbers of processes) for changes of resources may be used as distances.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing method to be executed by a processor included in an information processing device, the information processing method comprising:

receiving a plurality of requests for providing constituent elements including a software from a plurality of terminal devices, each of the terminal devices belonging to a different tenant in a shared cloud system;

extracting, from the plurality of requests, a pair of requests of which software resources are determined to be similar to each other based on a predetermined threshold of similarity;

specifying terminal devices that are transmission sources of the pair of requests from among the plurality of terminal devices;

setting a candidate of software resource which is similar to each of the software resources that the specified terminal devices have requested, the setting including determining whether an operation using the candidate is possible and setting of another candidate when it is determined that the operation using the candidate is not possible;

requesting for sharing the set candidate of software resource instead of using the requested software resources by transmitting information of the set candidate and a cost of the set candidate to the specified terminal devices, the cost of the set candidate being cheaper than a cost of each of the pair of requests, the cost of each of the pair of requests being related to an upgrade or downgrade of an operating system as required by the software resources included in the respective request; and executing a process of transition ing to sharing of the candidate when approval signals representing that the sharing is approved are received from the specified terminal devices.

2. The information processing method according to claim 1, further comprising:

excluding, when an approval signal of the approval signals is not received from at least one of the specified terminal devices, the at least one of the specified terminal devices to generate excluded terminal devices;
resetting the candidate based on the excluded terminal devices generated by the excluding;
calculating a cost of the reset candidate; and
requesting for sharing the reset candidate by transmitting information of the reset candidate and the calculated cost to the excluded terminal devices.

3. The information processing method according to claim 1, wherein the extracting includes:
determining combinations of one or more first constituent elements to be used by a first terminal device among the plurality of terminal devices and one or more second constituent elements to be used by a second terminal device that is among the plurality of terminal devices and different from the first terminal device;
calculating, for the combinations, load levels that represent loads when at least one of the first constituent elements is changed to at least one of the second constituent elements; and
calculating the similarities corresponding to changes from the first terminal device to the second terminal device by summing the load levels calculated for the combinations.

4. The information processing method according to claim 3, wherein the specifying includes:
setting the predetermined threshold for the similarities;
extracting a combination, having a similarity lower than the predetermined threshold, of the first terminal device and the second terminal device; and
specifying the terminal devices included in the combination.

5. The information processing method according to claim 1, further comprising:
grouping the specified terminal devices into multiple groups based on similarities,
wherein the setting includes setting the candidate of the constituent elements for each of the groups.

6. The information processing method according to claim 1, wherein the transmitting of the cost of the set candidate includes:
calculating, for each of the specified terminal devices, an amount of a reduction in an operation cost, the reduction being caused by the use of the set candidate; and
transmitting the amount of the reduction together with the cost of the set candidate to the specified terminal devices.

7. The information processing method according to claim 1, wherein the executing includes:
starting time measurement when the information of the set candidate and the information of the cost of the set candidate are transmitted to the specified devices; and
executing a process of transitioning to sharing of the set candidate when the approval signals are received before a predetermined time elapses after the start of the time measurement.

8. An information processing device comprising:
a memory; and
a processor coupled to the memory and configured to:
receive a plurality of requests for providing constituent elements including a hardware and a software from a plurality of terminal devices, each of the terminal devices belonging to a different tenant in a shared cloud system;
extract, from the plurality of requests, a pair of requests of which software resources are determined to be similar to each other based on a predetermined threshold of similarity;
specify terminal devices that are transmission sources of the pair of requests from among the plurality of terminal devices;
set a candidate of software resource which is similar to each of the software resources that the specified terminal devices have requested, determine whether an operation using the candidate is possible, and set another candidate when it is determined that the operation using the candidate is not possible;
request for sharing the set candidate of software resource instead of using the requested software resources by transmitting information of the set candidate and a cost of the set candidate to the specified terminal devices, the cost of the set candidate being cheaper than a cost of each of the pair of requests, the cost of each of the pair of requests being related to an upgrade or downgrade of an operating system as required by the software resources included in the respective request; and
execute a process of transitioning to sharing of the candidate when approval signals representing that the sharing is approved are received from the specified terminal devices.

9. The information processing device according to claim 8, wherein the processor is further configured to:
exclude, when an approval signal of the approval signals is not received from at least one of the specified terminal devices, the at least one of the specified terminal devices to generate excluded terminal devices;
reset the candidate based on the excluded terminal devices generated by the excluding;
calculate a cost of the reset candidate; and
request for sharing the reset candidate by transmitting information of the reset candidate and the calculated cost to the excluded terminal devices.

10. The information processing device according to claim 8, wherein the processor is configured to:
determine combinations of one or more first constituent elements to be used by a first terminal device among the plurality of terminal devices and one or more second constituent elements to be used by a second terminal device that is among the plurality of terminal devices and different from the first terminal device;
calculate, for the combinations, load levels that represent loads when at least one of the first constituent elements is changed to at least one of the second constituent elements; and
calculate the similarities corresponding to changes from the first terminal device to the second terminal device by summing the load levels calculated for the combinations.

11. The information processing device according to claim 10, wherein the processor is configured to:
set the predetermined threshold for the similarities;
extract a combination, having a similarity lower than the predetermined threshold, of the first terminal device and the second terminal device; and
specify the terminal devices included in the combination.

12. A non-transitory computer-readable storage medium storing a program that causes a computer to execute a process, the process comprising:
receiving a plurality of requests for providing constituent elements including a hardware and a software from a plurality of terminal devices, each of the terminal devices belonging to a different tenant in a shared cloud system;

extracting, from the plurality of requests, a pair of requests of which software resources are determined to be similar to each other based on a predetermined threshold of similarity;

specifying terminal devices that are transmission sources of the pair of requests from among the plurality of terminal devices;

setting a candidate of software resource which is similar to each of the software resources that the specified terminal devices have requested, the setting including determining whether an operation using the candidate is possible and setting of another candidate when it is determined that the operation using the candidate is not possible;

requesting for sharing the set candidate of software resource instead of using the requested software resources by transmitting information of the set candidate and a cost of the set candidate to the specified terminal devices, the cost of the set candidate being cheaper than a cost of each of the pair of requests, the cost of each of the pair of requests being related to an upgrade or downgrade of an operating system as required by the software resources included in the respective request; and executing a process of transition ing to sharing of the candidate when approval signals representing that the sharing is approved are received from the specified terminal devices.

13. The storage medium according to claim 12, further comprising:

excluding, when an approval signal of the approval signals is not received from at least one of the specified terminal devices, the at least one of the specified terminal devices to generate excluded terminal devices;

resetting the candidate based on the excluded terminal devices generated by the excluding;

calculating a cost of the reset candidate; and requesting for sharing the reset candidate by transmitting information of the reset candidate and the calculated cost to the excluded terminal devices.

14. The storage medium according to claim 12, wherein the extracting includes:

determining combinations of one or more first constituent elements to be used by a first terminal device among the plurality of terminal devices and one or more second constituent elements to be used by a second terminal device that is among the plurality of terminal devices and different from the first terminal device;

calculating, for the combinations, load levels that represent loads when at least one of the first constituent elements is changed to at least one of the second constituent elements; and calculating the similarities corresponding to changes from the first terminal device to the second terminal device by summing the load levels calculated for the combinations.

15. The information processing method according to claim 1, wherein the set candidate includes a part of existing constituent elements already used by the specified terminal devices.

16. The information processing method according to claim 2, wherein the resetting and the requesting for sharing the reset candidate are repeated until all of the excluded terminal devices approve sharing the reset candidate.

* * * * *